Oct. 16, 1956 — T. J. PIEL — 2,766,789
HACK SAW BLADE REINFORCING COUPLING
Filed June 12, 1953
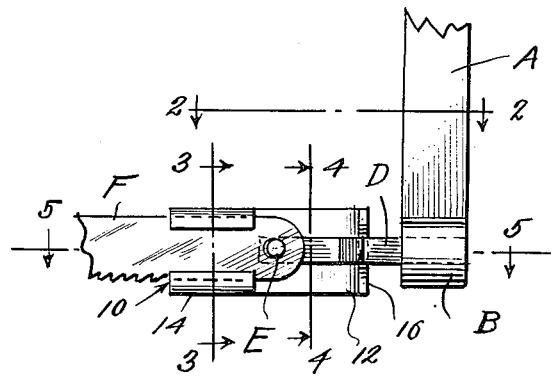
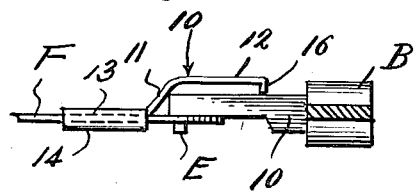
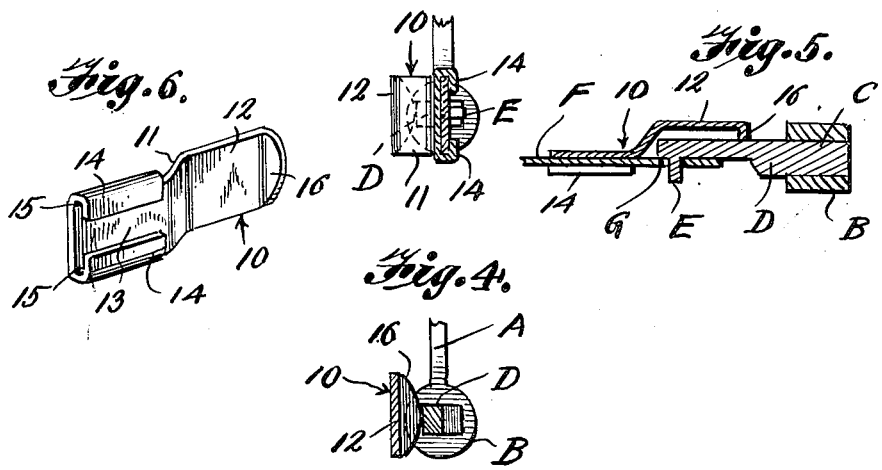
INVENTOR.
THOMAS J. PIEL
BY
Patrick D. Beaver
ATTORNEY

United States Patent Office 2,766,789
Patented Oct. 16, 1956

2,766,789

HACK SAW BLADE REINFORCING COUPLING

Thomas J. Piel, St. Louis, Mo.

Application June 12, 1953, Serial No. 361,131

1 Claim. (Cl. 145—35)

This invention relates to improvements in hack saws and more particularly to a hack saw blade coupling.

The principal object of the present invention is to provide a hack saw blade coupling, constructed in such a manner as to reinforce and rigidify the blade to permit better use and control of the blade and to minimize blade breakage.

These and various other objects and advantages of the invention will become apparent to the reader of the following description.

In the drawing:

Figure 1 is a fragmentary side elevational view showing portions of the hack saw frame, blade and the coupling.

Figure 2 is a section taken substantially on line 2—2 of Figure 1.

Figure 3 is a section taken on line 3—3 of Figure 1.

Figure 4 is a section taken on line 4—4 of Figure 1.

Figure 5 is a section taken on line 5—5 of Figure 1.

Figure 6 is a perspective view of the coupling.

Referring to the drawing, wherein like numerals designate like parts, it can be seen that reference character A denotes one leg of a hack saw frame, this having the usual turret B for receiving the end C of the conventional stub D, which has a lateral pin E. Reference character F denotes a conventional hack saw blade having an opening G to receive the pin E.

In carrying out the present invention, a coupling generally referred to by numeral 10 constitutes the present invention. This coupling is primarily stamped from a plate of spring steel metal, the central portion of which is offset laterally as at 11 to provide the end portions 12 and 13. The end portion 13 has wing portions which are bent inwardly to define flanges 14, 14 and these flanges, being spaced from the end portion 13 define slideways 15, 15 for the upper and lower portions of the hack saw blade F.

The end portion 12 of the coupling 10 has an inwardly disposed lug 16.

In the use and operation of this structure, the end of the blade not shown is properly positioned and then the coupling 10 is slid over the other end of the hack saw blade F, as shown in Figures 1 and 5.

The end portion 12 is then pulled outwardly after the terminal portion of the hack saw blade F is set over the pin E so that the end of the hack saw blade will ride the pin E, while the lug 16 will ride the side of the stub D, as shown in Figure 1 when this end of the hack saw blade is forced inwardly, with the result that the pin E will seat in the opening G and the end portion 12 with it, the lug 16 will exert spring pressure against the opposite side of the stub D. The flanged portion 13 of the coupling will now offer reinforcement to the blade. Thus this coupling serves as a fastening device and also a stiffening factor for the hack saw blade.

While the foregoing description sets forth the invention in specific terms, it is to be understood that numerous changes in the shape, size and materials may be resorted to without departing from the spirit and scope of the invention, as claimed hereinafter.

Having described the invention, what is claimed as new is:

For use with a hacksaw frame including a stub having a lateral pin receivable in one end of a saw blade, the provision of a coupling comprising an elongated body of spring material, said body being divided into a pair of substantially parallel end portions interconnected by an offset central portion, a pair of inwardly directed flanges formed integrally with the sides of one end portion, and a lug formed integrally with the free end of the other end portion, said flanges adapted to encompass a portion of a saw blade engaged by said pin, and said lug adapted to bear against that side of said stub opposite to the side from which said pin extends.

References Cited in the file of this patent

UNITED STATES PATENTS

| | | |
|---|---|---|
| 576,626 | Starret | Feb. 9, 1897 |
| 650,913 | Saxton | June 5, 1900 |
| 1,277,879 | Donnelly | Sept. 3, 1918 |
| 1,413,348 | Parsley | Apr. 18, 1922 |
| 1,569,407 | Spartivento | Jan. 12, 1926 |
| 2,645,261 | Swantrom | July 14, 1953 |
| 2,676,630 | Furman | Apr. 27, 1954 |